United States Patent
Xia et al.

(10) Patent No.: US 6,496,327 B2
(45) Date of Patent: Dec. 17, 2002

(54) ARM AND SUSPENSION SHROUD FOR A DISC DRIVE

(75) Inventors: Su Xia, Eden Prairie, MN (US); Yu-Li Chang, Prior Lake, MN (US); Kent J. Forbord, St. Louis Park, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/997,949

(22) Filed: Nov. 30, 2001

(65) Prior Publication Data

US 2002/0122273 A1 Sep. 5, 2002

Related U.S. Application Data

(60) Provisional application No. 60/273,453, filed on Mar. 5, 2001.

(51) Int. Cl.[7] .............................................. G11B 33/14
(52) U.S. Cl. ................................................... 360/97.03
(58) Field of Search ........................... 360/97.02–97.04

(56) References Cited

U.S. PATENT DOCUMENTS

| | | | | |
|---|---|---|---|---|
| 6,091,570 A | * | 7/2000 | Hendriks | 360/97.03 |
| 6,147,834 A | * | 11/2000 | Srikrishna et al. | 360/97.02 |
| 6,362,937 B1 | * | 3/2002 | Gibbs et al. | 360/97.02 |
| 6,369,978 B1 | * | 4/2002 | Shimizu et al. | 360/97.03 |

* cited by examiner

*Primary Examiner*—Allen Cao
(74) *Attorney, Agent, or Firm*—Westman, Champlin & Kelly, P.A.

(57) ABSTRACT

A shroud mounted to the housing of a disc drive blocks wind to the arm and suspension that positions a slider adjacent a recording surface of a disc. A first wall has a windward surface facing into the direction of rotation of the first disc. A second wall extends downwind from the windward surface between the arm and the disc to from a low-wind region with the first wall. The region is open at the leeward side so that the arm in the low-wind region positions the slider adjacent the disc. In some embodiments, a third wall is parallel to the second wall so that the low-wind region is a slot.

18 Claims, 6 Drawing Sheets

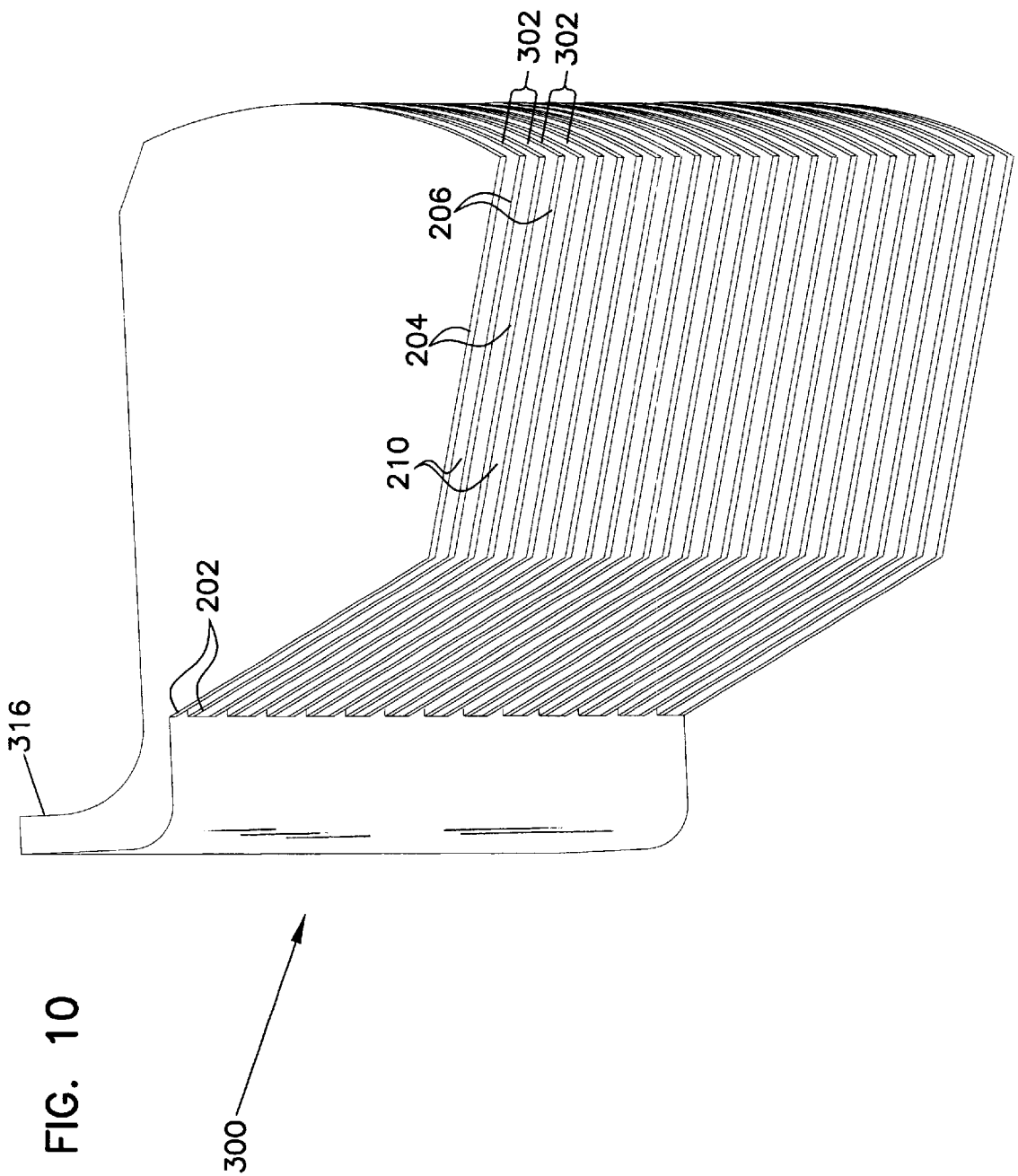

ARM AND SUSPENSION SHROUD FOR A DISC DRIVE

CROSS-REFERENCE TO RELATED APPLICATION

This application claims benefit of U.S. Provisional Application No. 60/273,453, filed Mar. 5, 2001.

FIELD OF THE INVENTION

This invention relates to disc drives, and particularly to an improved shroud that protects the arm and suspension assembly of the disc drive from wind from a rotating disc for minimizing fly height modulation of an aerodynamic slider.

BACKGROUND OF THE INVENTION

Certain magnetic, electromagnetic and optical disc drives employ aerodynamic sliders arranged to "fly" a predetermined distance from the confronting recording surface of the rotating disc. Wind, caused by the disc rotation, reacts against air bearing surfaces on the slider that is attached to the arm and suspension assembly of the drive, causing the slider, and its transducing head, to "fly" the predetermined distance from the recording surface. The wind also strikes the arm and suspension assembly.

The wind velocity changes across the radius of the rotating disc due to the different linear velocity at different radii across the disc. The profile of the arm to the radius of the disc is smaller when the arm positions the head at an outer radius track than when the arm positions the head at an inner radius. Consequently, the velocity of the wind striking the arm and suspension assembly varies with the extent of the arm across the radius, with greatest variation in wind velocity across the arm profile occurring when the arm extends across the disc radius to position the head at an inner track. Moreover, the wind striking the arm and suspension assembly introduces air turbulence that also affects wind velocity. Air turbulence and changing wind velocity striking the arm and suspension assembly may introduce modulation in arm and suspension assembly that is translated by the suspension to the slider to modulate the fly height of the slider. Fly height modulation may adversely affect the flying characteristics of the head and the data transfer characteristics of the transducer carried by the slider. Moreover, as the data storage capacity of disc drives increases, data density increases requiring smaller recording patterns to avoid cross-talk. Smaller recording patterns require the heads to fly at lower fly heights to the recording surface for read and write operations.

Fly height modulation is a limiting factor on decreasing slider fly heights. It is generally accepted that the fly height of a slider should not modulate more than about 10% of the design fly height. Where the design fly height is 10 nanometers, fly height modulation should not exceed 1 nanometer, which is an amount that can be exceeded due to wind striking the arm and suspension assembly. Consequently, there is need for lower fly heights as data storage density continues to increase, thereby increasing the need to minimize fly height modulation.

Various shrouds have been proposed to control wind in a disc drive. Shrouds described in U.S. Patent Nos. 4,473,855 and 4,879,618 are intended to shield the arm from wind. These shrouds are carried on, and movable with, the arm assembly, thereby adding mass to the arm assembly. The increased mass due to the shroud increases the inertia of the arm assembly during track seeking and positioning operations, thereby adversely affecting performance of the disc drive. Numerous shrouds and baffles have been proposed to control air flow in a disc drive without shielding the arm, such as to control air movement at the edge of the disc to prevent disc flutter (U.S. Pat. No. 6,125,003) and to aid in filtering the air (U.S. Pat. No. 5,696,649), to name a few. There has not been an effective shroud that shields the arm and suspension from the wind without adding to the mass of the arm assembly. The present invention provides a solution to this and other problems, and offers other advantages over the prior art.

SUMMARY OF THE INVENTION

A shroud has a mount for mounting the shroud to a housing, such as a wall of a disc drive housing of a disc drive having an arm that positions a device, such as a slider, in a windy environment. Shielding means shields the arm from wind while the arm positions the device in the windy environment. In preferred embodiments, the shield includes a first wall defining a windward surface. In other embodiments, a second wall is perpendicular to the first wall, so that the first and second walls together form a low-wind region with an opening into the region at a leeward side allowing the arm in the low-wind region to position the device in the windy environment.

In some embodiments, a third wall perpendicular to the first wall and parallel to the second wall define a low-wind slot for receiving the arm.

The shroud is positioned in the disc drive so that the second and third walls are between the arm and the rotating disc.

Other features and benefits that characterize the present invention will be apparent upon reading the following detailed description and review of the associated drawings.

BRIEF DESCRIPTION OF THE DRAWINGS

FIG. 10 is a perspective view of a second embodiment of a shroud according to the present invention.

DETAILED DESCRIPTION

Figure 1:
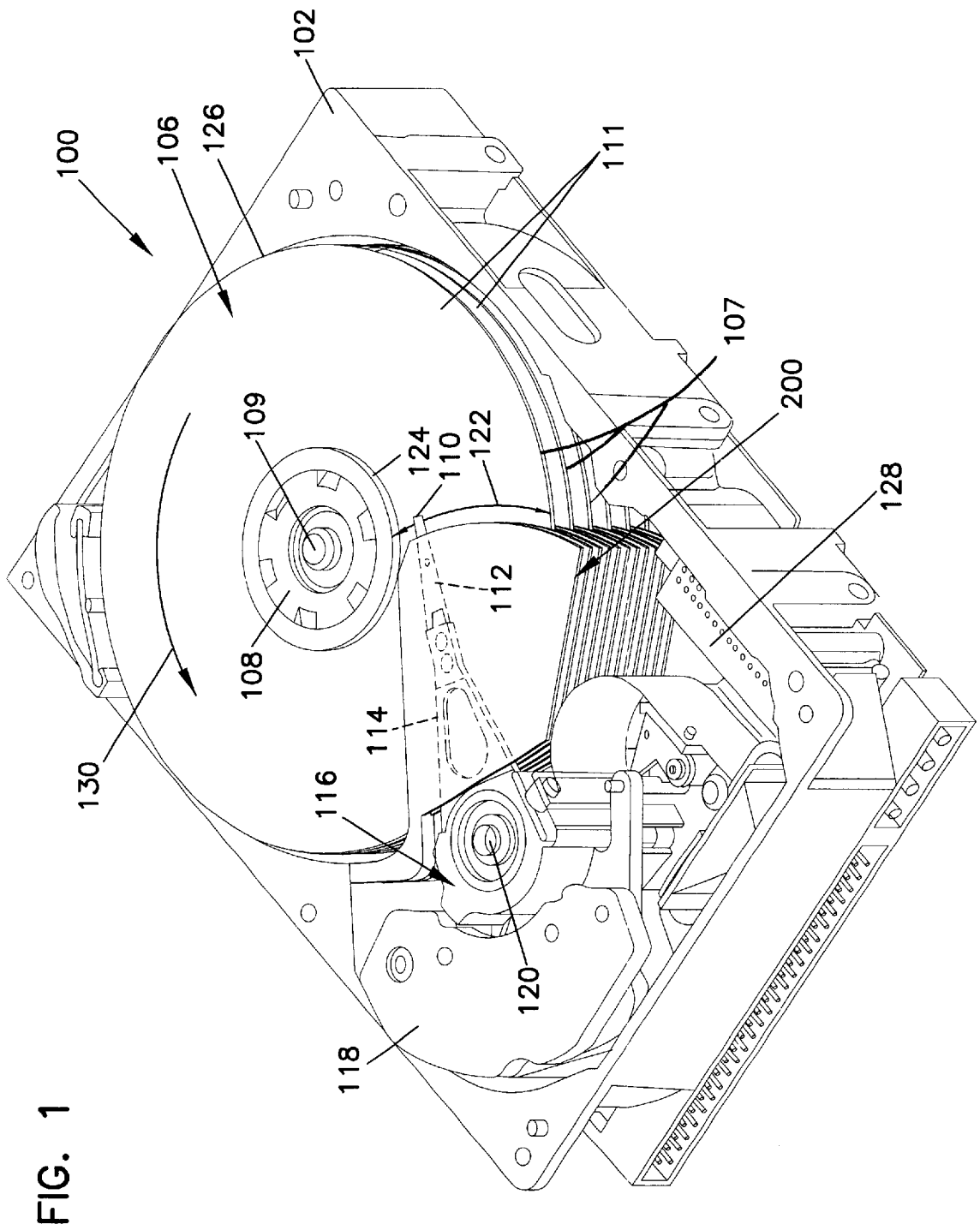
FIG. 1 is a perspective view of a disc drive showing the position of a shroud according to a first embodiment of the present invention.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each recording surface 111 has an associated disc headslider 110 that is mounted to a respective suspension 112 to aerodynamically "fly" above the confronting recording surface 111 of an individual disc of disc pack 106. Each head-slider 110 includes a slider portion having air bearing surfaces that aerodynamically reacts with windage from the rotating disc 107 to fly a predetermined distance from the respective recording surface 111, and a transducing head arranged to write data to, and read data from, concentric tracks on the confronting disc surface. In the example shown in FIG. 1, head-sliders 110 are supported by suspensions 112 which are in turn attached to track accessing arms 114 of an actuator assembly 116. Arms 114 may, for example, be part of an E-block to access plural recording surfaces of one or more discs. Actuator assembly 116 is driven by a voice coil motor (VCM) 118 to rotate the actuator, and its attached head-sliders 110, about an axis 120 of an pivot shaft of the actuator. Rotation of actuator assembly 116 moves the heads along an arcuate path 122 to position the heads over a desired data track between a disc inner diameter 124 and a disc outer diameter 126. Voice coil motor 118 is driven by servo electronics included on circuit board 128 based on signals generated by the heads of head-sliders 110 and a host computer (not shown). Read and write electronics are also included on circuit board 128 to supply signals to the host computer based on data read from disc pack 106 by the read heads of head-sliders 110, and to supply write signals to the write head of head-sliders 110 to write data to the discs.

As the spindle motor rotates discs 107 at a design velocity in the direction of arrow 130, windage carried by the rotating discs in the direction of arrow 130 reacts with the air bearing surfaces on head-sliders 110, causing the head-sliders to aerodynamically "fly" a design distance from the respective recording surface 111. However, wind striking the arm and suspension may alter the flying characteristics of the head-slider. The present invention provides a shroud 200 that shields the windward edge surfaces of arm 114 and suspension 112 from wind caused by the rotating discs, while at the same time permitting wind to support the slider in flying relation to the rotating disc, so that the flying characteristics of the head-sliders 110 are established solely by the slider design and its reaction to the wind velocity at the given radius of the slider. Without shroud 200, wind striking arm 114 and suspension 112 would cause modulation in the fly height of head-slider 110.

FIGS. 2–9 illustrate a shroud 200 according to a first embodiment of the invention. Shroud 200 receives an arm 114 and suspension 112 of an actuator assembly 116. In most disc drives, shroud 200 will encompass each arm and suspension assembly of the disc drive. Consequently, a disc drive having a single disc (having two recording surfaces 111) with an arm assembly and slider adjacent each surface, will have two shrouds 200, one for each of the two arm assemblies. In the case of a disc drive having two discs (having four surfaces), a single arm is usually employed between the discs with separate sliders 110 independently suspended from the arm. Consequently, there will be three shrouds 200 for such an apparatus, one for each of the two arms above the top-most disc and below the bottom-most disc, and the third shroud for the arm between the discs.

Figure 2:
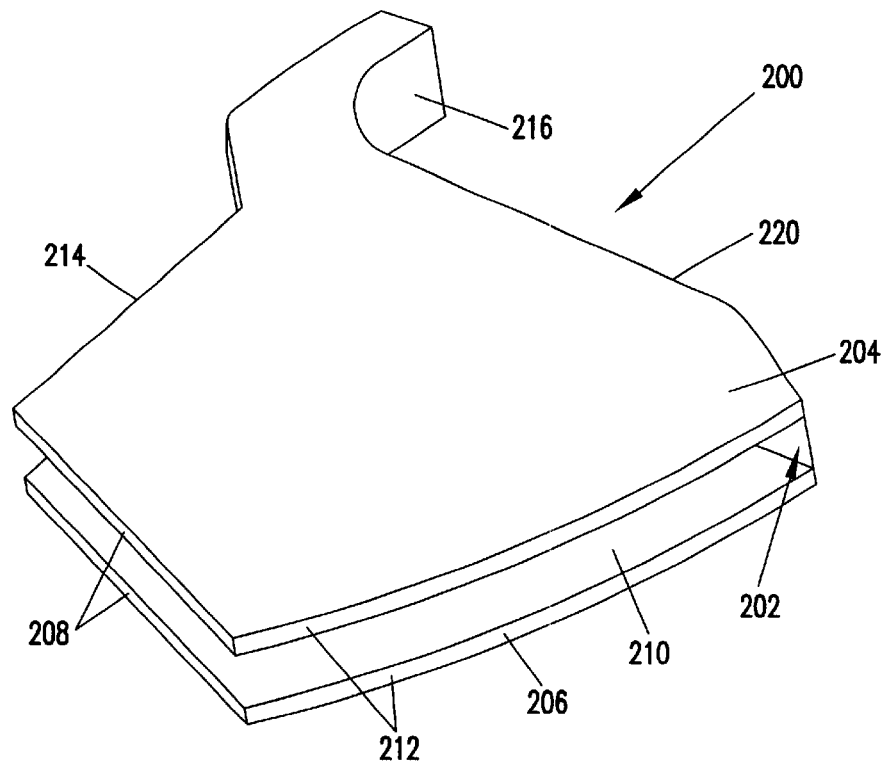
FIG. 2 is a perspective view of the shroud shown in FIG. 1.
Figure 3:
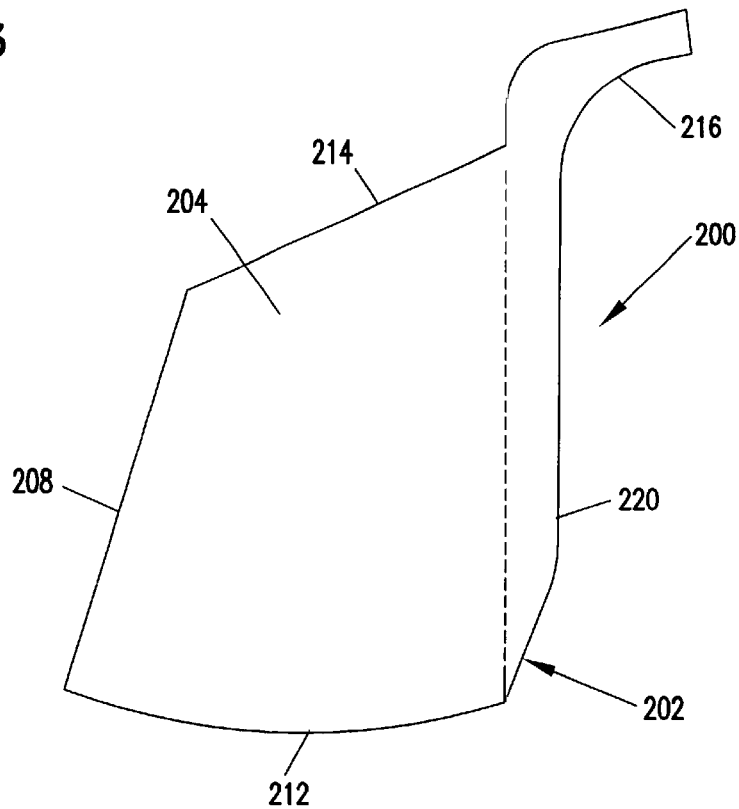
FIGS. 3–7 are top, leeward, proximal, windward and side views, respectively, of the shroud illustrated in FIGS. 1 and 2.
Figure 4:
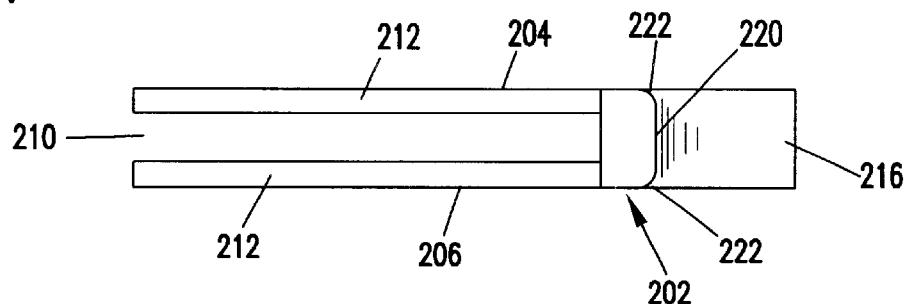
Figure 5:
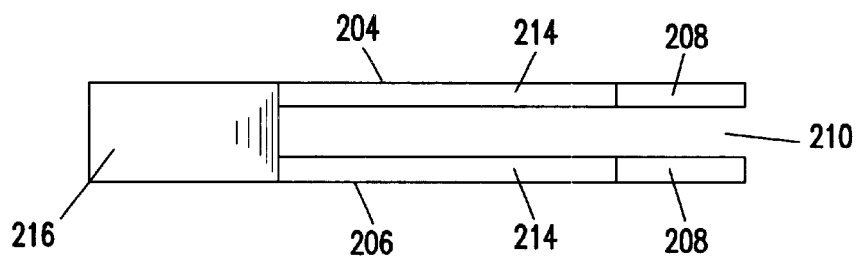
Figure 6:
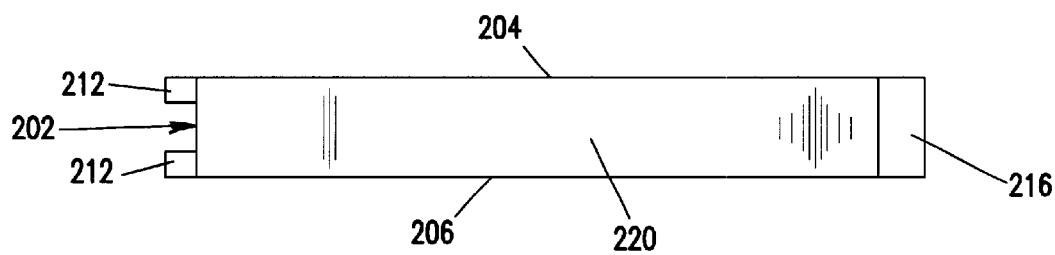
Figure 7:
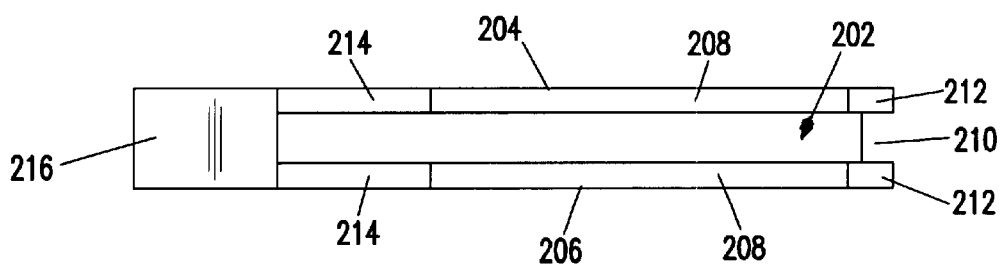
Figure 9:
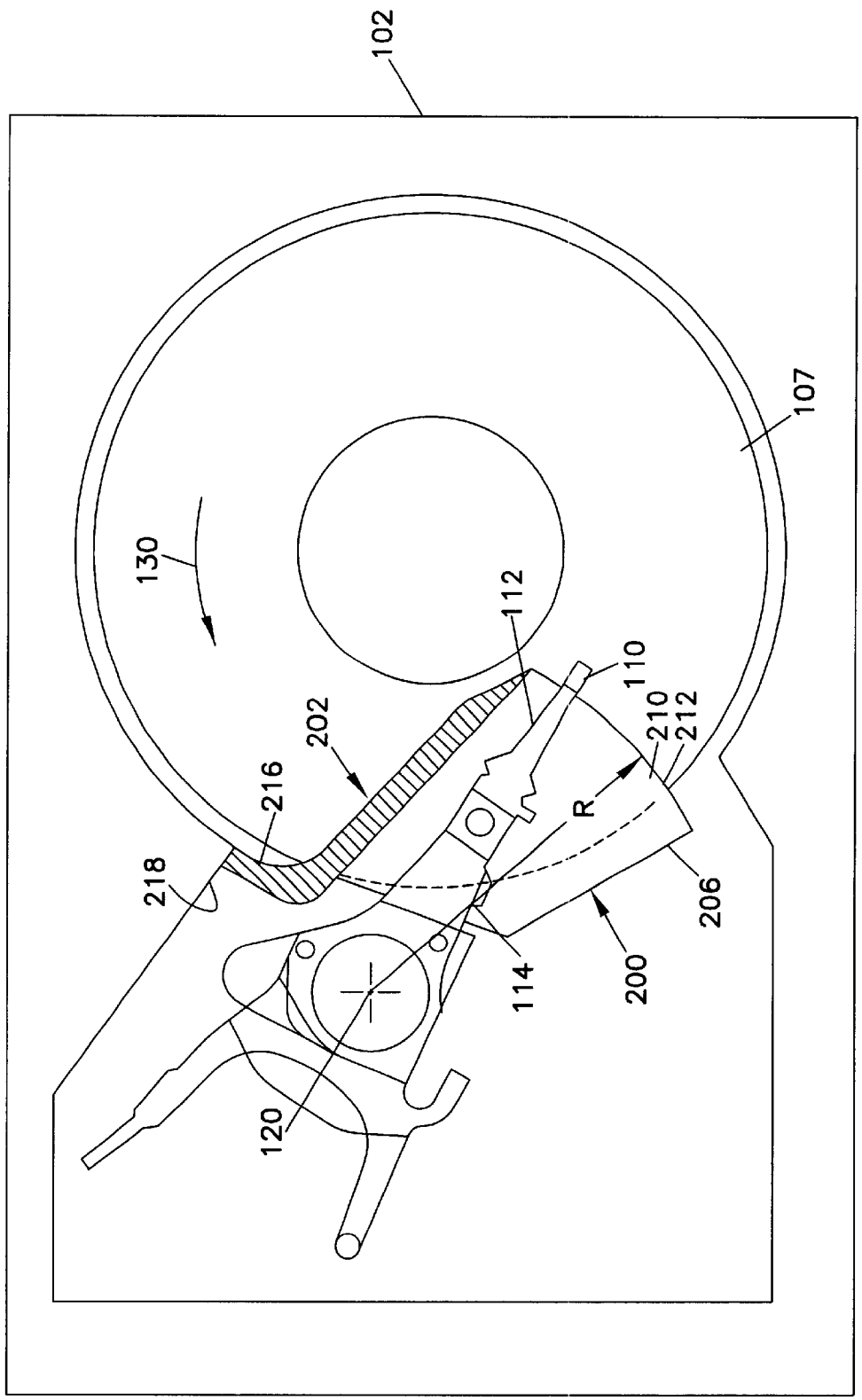
FIG. 9 is a top view schematically illustrating the position of the shroud illustrated in FIGS. 1–8 with an arm assembly in a disc drive.

As shown particularly in FIGS. 2 and 3, each shroud is constructed of an integral body of rigid material, such as plastic, and includes a wall 202 having a windward surface 220 at the windward side (shown in FIG. 6) arranged to confront the wind that flows in a generally circular path along disc 107, represented by arrow 130 (FIGS. 1 and 9). As shown in FIGS. 2 and 4, top and bottom walls 204 and 206 extend from wall 202 toward side 208 (shown in FIG. 7). Walls 204 and 206 are generally perpendicular to wall 202. As shown in the leeward and proximal views (FIGS. 4 and 5, respectively), walls 204 and 206 are generally parallel to each other to define a slot 210 that is open at side 208, leeward side 212 and proximal side 214. Arm 114 extends through proximal side 214 into the low-wind region, or interior, of the shroud. The edges of top and bottom surfaces 204 and 206 at leeward side 212 are curved to parallel arc 122 (FIG. 1) and are defined by a circle of radius R centered on axis 120 of the actuator assembly (FIG. 9). As shown particularly in FIGS. 2 and 3, wall 202 includes an extension 216 from proximal side 214 to form a solid base for attachment to wall 218 of housing 102 (FIG. 9). The base extension 216 of each shroud is attached to housing 102 with a suitable adhesive or other fastener, such as screws.

Windward wall 202 extends generally radially across disc 107, although, as shown particularly in FIGS. 3 and 9, the windward surface 220 of wall 202 is curved to direct wind downstream of the shroud at an inner radius of disc 107 where the linear velocity of the wind is not as great as at outer radii. As shown particularly in FIG. 4, the junctions of wall 202 with top and bottom walls 204 and 206 are also curved at 222, aiding in the aerodynamic nature of the shroud. Leeward side 212 is extends generally radially across disc 107 with an arcuate edge defined by radius R from the axis 120 of the actuator assembly. As shown particularly in FIG. 9, the arc formed by leeward side 212 allows the arm assembly to position slider 110 past the leeward side and outside of slot 210 defined by the shroud. Sides 208 and 214 extend generally tangential to the circumference of disc 107. Slot 210 forms a generally backward C-shaped slot ( ⊃ ) at the leeward side 212.

Figure 8:
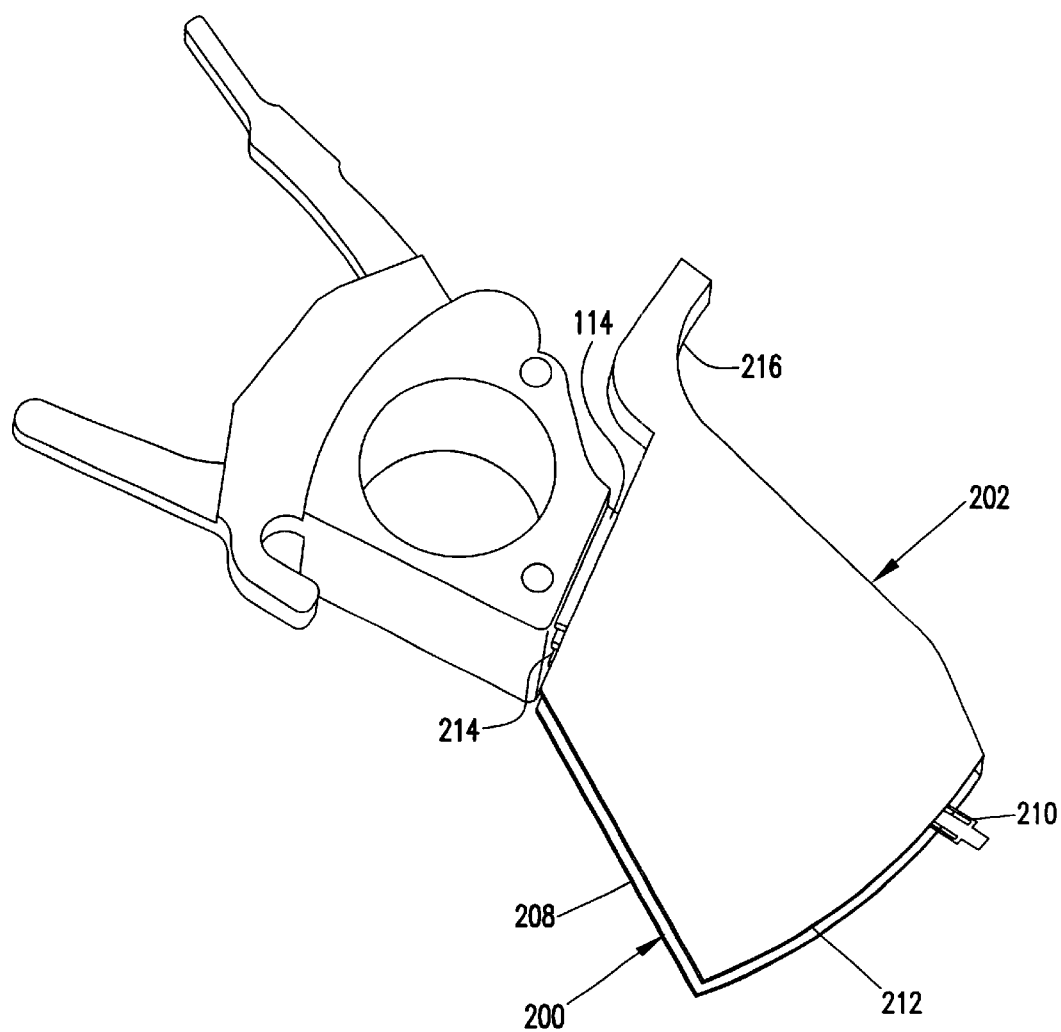
FIG. 8 is a perspective view of the shroud illustrated in FIGS. 1–7 with an arm assembly of a disc drive positioned therein.

As shown particularly in FIGS. 8 and 9, the shroud protects the arm 114 and suspension 112 from wind carried by the rotation of disc 107. The radius R of edge 212 is designed so that head-slider 110 extends beyond edge 212 as to "fly" aerodynamically with respect to surface 111 of disc 107. The shroud encloses the head-arm assembly on the windward side, and on the sides confronting the discs, to effectively remove the arm and suspension from the effects of wind from the discs. Consequently, the wind strikes only the aerodynamic slider, thereby minimizing risk of fly height modulation due to modulation of the arm and suspension. Consequently, slider 110 can be designed to fly close to the disc with minimal fly height modulation.

FIG. 10 illustrates another embodiment wherein a shroud 300 includes a single base 316 for mounting to the housing 102 of a multi-disc disc drive. A plurality of individual shroud portions 302 are configured similar to shroud 200 of FIGS. 1–9, each shroud portion including a windward wall 202, top wall 204 separating an arm (not shown in FIG. 10) from a disc above the arm, and a bottom wall 206 separating the arm from a disc below the arm. Base 316 mounts to a wall in the disc drive housing (not shown in FIG. 10) in the same manner as base 216 mounts to the housing in the embodiment of FIGS. 1–9. In this case, the successive discs of the disc stack 106 are positioned between shrouds 200 such that the individual arms 114 of the an E-block assembly, such as E-block 116 shown in FIG. 1, is within each slot 210 of each shroud 200. Preferably, slot 210 is open to side 208 of the shroud to permit easy assembly of the shroud with respect to the plurality of arms. Thus, the arms of the E-block can be inserted into the respective slots so that the shroud can mounted to the disc drive housing to allow free movement of the arms. Moreover, in some embodiments of a disc drive, the open slot permits moving the arm to a position outside the outer radius of the recording discs 107 for purposes of parking the arm and head assembly.

The present invention thus provides a shroud for use in a disc drive to protect the arm and suspension assemblies from wind and turbulence within the disc drive. While the shroud is described as being aerodynamic along the windward side, the aerodynamic nature of the shroud is not necessary for operation of the shroud to protect the arm and suspension assembly from wind. Instead, the aerodynamic nature of the shroud is useful to reduce resistance to wind that is generated by the revolving disc, thereby minimizing turbulence and reducing power requirements of the spindle motor necessary to maintain rotation of discs 107 at a selected constant rotational velocity.

In preferred embodiments, shroud 200 includes both top and bottom walls 204 and 206. In some embodiments, top wall 204 may be eliminated, such as where there is no disc above low-wind region 210. Similarly, bottom wall 206 may be eliminated were there is no disc below the low-wind region. Nevertheless, since the shroud may be molded of rigid plastic, it may be more economical to employ the same style shroud, with both top and bottom walls 204 and 206, regardless of whether a disc is above or below the shroud.

Stated another way, an embodiment of the invention is a shroud (such as shroud 200, 300) for use with an arm (such as arm 114, 112) that positions a device (such as a slider 110) in a windy environment. A mount (such as mount 216, 316) mounts the shroud to a housing (such as housing 102 of the disc drive) and a shield ( such as shield 202, 204, 206) shields the arm from wind while the arm positions the device in the windy environment.

In some embodiments, the shield includes a first wall (such as wall 202) defining a windward surface (such as surface 220). A second wall (such as wall 204) is perpendicular to the first wall to form a low-wind region (such as region 210). The low-wind region (such as region 210) is open at a leeward side (212), and the arm (114, 112) is receivable within the low-wind region (210) to position the device (110) within the windy environment.

In some embodiments a third wall (such as wall 206) is perpendicular to the first wall (202) and parallel to the second wall (204) to define the low-wind region in the form of a slot (such as slot 210) for receiving the arm (114, 112).

In some embodiments, the wind is generated by a revolving disc (107), and the mount (216, 316) positions the first wall (202) so that the windward surface (220) faces into the direction of rotation of the disc. The arm (114, 112) is thereby shielded from the wind.

In other embodiments a disc drive (100) includes a housing (such as housing 102) with a first rotatable disc (107) supported within the housing for rotation in a predetermined direction (130). The first disc has a first recording surface (such as surface 111). An arm (114, 112) is supported within the housing (102) for rotation about an axis (120). A first slider (110) is supported by the arm and arranged to be positioned adjacent the first recording surface (111) of the first disc (107). A shroud (such as shroud 200, 300) includes a first wall (such as wall 202) having a windward surface facing into the direction of rotation (130) of the first disc (107). A second wall (such as wall 204) is perpendicular to the first wall and extends downwind of the windward surface between the arm (114, 112) and the first disc (107). The first and second walls together form a low-wind region (210) that is open at a leeward side (212). The arm is receivable within the low-wind region (210) to position the first slider (110) adjacent the first disc (107). A mount (such as mount 216, 316) mounts the shroud to the housing.

In some embodiments the disc drive includes a second rotatable disc (107) supported within the housing (102) for rotation in the predetermined direction (130). The second disc has a first recording surface (111). A second slider (110) is supported by the arm (214, 212) and is arranged to be positioned adjacent the first recording surface of the second disc. The shroud further includes a third wall (such as wall 206) perpendicular to the first wall (202) and parallel to the second wall (204) to define a slot (210) for receiving the arm. The third wall extends downwind of the windward surface (220) between the arm and the second disc.

Although the present invention has been described with reference to shrouds for use in disc drive, those skilled in the art will recognize that the present invention may be practiced with other system modifications, including but not limited to systems where a suspended or cantilevered device is to be protected from wind. Therefore, the shroud might be used to protect the suspension assembly of a suspended or cantilevered device for wind generated from any source, including naturally occurring wind.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for shroud while maintaining substantially the same functionality without departing from the scope and spirit of the present invention. For example, the shroud is primarily protecting the suspension arm assembly from the effects of wind. Surfaces 204 and 206 serve to protect the assembly from the wind along the confronting disc surface. Consequently, in a disc drive having plural discs, the top surface 204 might not be needed for the top shroud (since bottom surface 206 protects the upper-most arm from the upper-most disc), and the bottom surface might not be needed for the bottom shroud. In addition, although the invention is described herein is directed to disc drives, it will be appreciated by those skilled in the art that the teachings of the present invention can be applied to other technologies, without departing from the scope and spirit of the invention.

What is claimed is:

1. A shroud for blocking wind to an arm that positions a slider adjacent a recording surface of a disc that rotates in a predetermined direction in a disc drive housing to generate wind that aerodynamically supports the slider, the shroud comprising:
    a mount for mounting to the housing; and
    a shield attached to the mount, the shield including
        a first wall substantially perpendicular to the recording surface adjacent a windward side of the arm to shield the arm from the wind when the arm positions the slider adjacent the disc.

2. The shroud of claim 1, wherein the shield further includes
    a second wall substantially perpendicular to the first wall and extending downwind from the first wall between the arm and the disc, the first and second walls together forming a low-wind region, and
    an opening into the region at a leeward side of the shield, the arm being receivable within the low-wind region to position the first slider adjacent the first disc.

3. The shroud of claim 2, further including:
    a third wall substantially perpendicular to the first wall and substantially parallel to the second wall to define a slot for receiving the arm.

4. The shroud of claim 3, wherein the disc drive includes a second disc that rotates in the predetermined direction in the disc drive and the arm is positioned between the first-named and second discs to position the first-named slider adjacent the recording surface of the first-named disc and the second slider adjacent a recording surface of the second disc, the third wall extending downwind from the first wall between the arm and the second disc.

5. The shroud of claim 4, wherein the disc drive housing further includes a second arm that positions a third slider adjacent a second recording surface of the first-named disc, the shroud further including:
   a fourth wall substantially perpendicular to the second recording surface adjacent a windward side of the second arm to shield the second arm from the wind when the second arm positions the third slider adjacent the first-named disc,
   a fifth wall substantially perpendicular to the fourth wall and extending downwind from the fourth wall between the second arm and the first-named disc, the fourth and fifth walls together forming a second low-wind region, and
   a second opening into the second region at a leeward side of the shield, the second arm being received within the second low-wind region to position the third slider adjacent the first-named disc.

6. The shroud of claim 2, wherein the arm is rotatable about an axis, and the opening includes
   an arcuate edge having a radius from the axis of rotation of the arm, so that the slider is positioned adjacent the disc at the leeward side of the shroud at rotational positions of the arm.

7. The shroud of claim 2, wherein the first wall has a curved windward surface facing into the direction of rotation of the disc.

8. A disc drive comprising:
   a housing;
   a first rotatable disc supported within the housing for rotation in a predetermined direction, the first disc having a first recording surface;
   an arm supported within the housing for rotation about an axis;
   a first slider supported by the arm and arranged to be positioned adjacent the first recording surface of the first disc; and
   a shroud including:
      a first wall substantially perpendicular to the disc adjacent a windward side of the arm,
      a second wall substantially perpendicular to the first wall and extending downwind from the first wall between the arm and the first disc, the first and second walls together forming a low-wind region,
      an opening into the region at a leeward side of the shroud, the arm being receivable within the low-wind region to position the first slider adjacent the first disc, and
      a mount mounting the shroud to the housing.

9. The disc drive of claim 8, further including:
   a second rotatable disc supported within the housing for rotation in the predetermined direction, the second disc having a first recording surface,
   a second slider supported by the arm and arranged to be positioned adjacent the first recording surface of the second disc,
the shroud further including:
   a third wall substantially perpendicular to the first wall and substantially parallel to the second wall to define a slot for receiving the arm, the third wall extending downwind from the first wall between the arm and the second disc.

10. The disc drive of claim 9, further including:
    a second arm supported within the housing for rotation about the axis,
    a third slider supported by the second arm and arranged to be positioned adjacent a second recording surface of the first disc,
the shroud further including:
    a fourth wall substantially parallel to the first wall adjacent a windward side of the second arm,
    a fifth wall substantially perpendicular to the fourth wall and extending downwind from the fourth wall between the second arm and the first disc, the fourth and fifth walls together forming a second low-wind region, and
    a second opening into the second region at a leeward side of the shroud, the second arm being received within the second low-wind region to position the third slider adjacent the first disc.

11. The shroud of claim 8, wherein the opening includes
    an arcuate edge having a radius from the axis of rotation of the arm, so that the first slider is positioned adjacent the first disc at the leeward side of the shroud at rotational positions of the arm.

12. The shroud of claim 8, wherein the first walls has a curved windward surface facing into the direction of rotation of the first disc.

13. A shroud for use with an arm that positions a device in a windy environment, the shroud comprising:
    a mount for mounting the shroud to a housing;
    a first wall supported by the mount having a windward surface for shielding the arm from wind while the arm positions the device in the windy environment;
    a second wall perpendicular to the first wall, the first and second walls together forming a low-wind region; and
    a first opening to the region at a leeward side of the shroud, the arm being receivable within the low-wind region to position the device within the windy environment.

14. The shroud of claim 13, further including:
    a third wall substantially perpendicular to the first wall and substantially parallel to the second wall to define a low-wind slot for receiving the arm.

15. The shroud of claim 14, wherein the arm is rotatable about an axis, and the opening includes:
    an edge having a radius from the axis of rotation of the arm, so that the device is positioned in the windy environment at the leeward side of the shroud at rotational positions of the arm.

16. The shroud of claim 15, further including:
    a second opening to the region at a side opposite the windward side to permit rotation of the arm outside the region.

17. The shroud of claim 13, wherein the arm is rotatable about an axis, and the opening includes:
    an edge having a radius from the axis of rotation of the arm, so that the device is positioned in the windy environment at the leeward side of the shroud at rotational positions of the arm.

18. The shroud of claim 17, further including:
    a second opening to the region at a side opposite the windward side to permit rotation of the arm outside the region.

* * * * *

UNITED STATES PATENT AND TRADEMARK OFFICE
CERTIFICATE OF CORRECTION

PATENT NO.    : 6,496,327 B2
DATED         : December 17, 2002
INVENTOR(S)   : Xia et al.

It is certified that error appears in the above-identified patent and that said Letters Patent is hereby corrected as shown below:

<u>Title page,</u>
Item [56], References Cited, U.S. PATENT DOCUMENTS, add:
-- 4,473,855    9/1984      Plotto et al ................... 360/107
   4,879,618    11/1989     Iida et al .................... 360/106
   5,696,649    12/1997     Boutaghou ................ 360/97.03
   5,898,545    4/1999      Schirle..................... 360/105
   5,956,206    9/1997      Schirle et al................ 360/97.03
   6,097,568    8/2000      Ekhoff....................... 360/97.02
   6,125,003    9/2000      Tsuda........................ 360/97.03 --

Signed and Sealed this

Twenty-ninth Day of April, 2003

JAMES E. ROGAN
*Director of the United States Patent and Trademark Office*